(12) United States Patent
O'Donnell

(10) Patent No.: US 11,209,040 B2
(45) Date of Patent: Dec. 28, 2021

(54) SELF-CLINCHING FASTENER

(71) Applicant: RB&W MANUFACTURING LLC, Streetsboro, OH (US)

(72) Inventor: Marc Andrew O'Donnell, Burlington (CA)

(73) Assignee: RB&W Manufacturing LLC, Streetsboro, OH (US)

(*) Notice: Subject to any disclaimer, the term of this patent is extended or adjusted under 35 U.S.C. 154(b) by 181 days.

(21) Appl. No.: 16/511,528

(22) Filed: Jul. 15, 2019

(65) Prior Publication Data
US 2021/0018032 A1 Jan. 21, 2021

(51) Int. Cl.
*F16B 37/06* (2006.01)

(52) U.S. Cl.
CPC .................. *F16B 37/068* (2013.01)

(58) Field of Classification Search
CPC .................................... F16B 37/068
USPC .................................. 411/179–180
See application file for complete search history.

(56) References Cited

U.S. PATENT DOCUMENTS

| | | | |
|---|---|---|---|
| 2,096,335 A * | 10/1937 | Nicholas | F16B 37/145 411/180 |
| 3,053,300 A | 9/1962 | Quinto | |
| 3,640,326 A * | 2/1972 | Brown | F16B 39/282 411/188 |
| 3,811,171 A | 5/1974 | Grube | |
| 3,878,599 A | 4/1975 | Ladouceur et al. | |
| 4,690,599 A | 9/1987 | Shinjo | |
| 5,067,224 A | 11/1991 | Muller | |
| 5,340,251 A | 8/1994 | Takahashi et al. | |
| 5,549,430 A * | 8/1996 | Takahashi | B21K 1/702 29/432.2 |
| 5,743,691 A | 4/1998 | Donovan | |
| 6,021,562 A | 2/2000 | Boster et al. | |

(Continued)

FOREIGN PATENT DOCUMENTS

| CN | 101280352 A | 10/2008 |
|---|---|---|
| CN | 103233960 A | 8/2013 |

(Continued)

OTHER PUBLICATIONS

International Search Report completed Apr. 14, 2020 in corresponding application PCT/US2019/041797, 3 pages.

(Continued)

*Primary Examiner* — Flemming Saether
(74) *Attorney, Agent, or Firm* — Pearne & Gordon LLP

(57) ABSTRACT

A self-clinching fastener for attachment to a plastically deformable metal panel includes a body portion with a central axis, the body portion has an outer peripheral surface extending in a direction perpendicular to the central axis. A punch portion is coaxial with the central axis and extends from the body portion such that the annular-shaped surface encircles the punch portion, the punch portion includes an outer peripheral surface extending in the direction of the central axis. A plurality of spaced apart lugs encircle the punch portion and axially projecting outwards from the annular-shaped surface, one of the lugs has a contact face configured to engage the metal substrate, the contact face declining, relative to an imaginary horizontal plane on which the annular-shaped surface lies, in a radially outwards direction of the self-clinching fastener.

8 Claims, 6 Drawing Sheets

(56) References Cited

U.S. PATENT DOCUMENTS

| | | |
|---|---|---|
| D437,211 S | 2/2001 | Pamer et al. |
| D440,865 S | 4/2001 | Pamer et al. |
| 6,220,804 B1 | 4/2001 | Pamer et al. |
| D448,659 S | 10/2001 | Pamer et al. |
| D448,660 S | 10/2001 | Pamer et al. |
| D454,057 S | 3/2002 | Pamer et al. |
| D454,484 S | 3/2002 | Pamer et al. |
| D457,054 S | 5/2002 | Pamer et al. |
| 6,409,444 B2 | 6/2002 | Pamer et al. |
| 6,712,370 B2 * | 3/2004 | Kawada ............... B60G 13/003 280/124.155 |
| 7,383,624 B2 | 6/2008 | Wojciechowski et al. |
| D613,596 S * | 4/2010 | Mangapora .................... D8/397 |
| 7,740,436 B2 | 6/2010 | Pamer |
| 8,062,141 B2 | 11/2011 | Pamer |
| 8,261,591 B2 | 9/2012 | Hielscher |
| 8,328,485 B2 * | 12/2012 | Babej ................ F16B 37/062 411/181 |
| 8,888,429 B2 | 11/2014 | Pamer et al. |
| 8,931,160 B2 * | 1/2015 | Shinjo .................. B23P 19/062 29/512 |
| 8,979,455 B2 | 3/2015 | Burton |
| 9,132,464 B2 | 9/2015 | Takacs et al. |
| 9,322,424 B2 | 4/2016 | Pamer et al. |
| 9,322,426 B2 | 4/2016 | Thomas |
| 9,574,602 B2 | 2/2017 | Burton |
| 9,849,549 B2 | 12/2017 | Diehl et al. |
| 2005/0076492 A1 | 4/2005 | Goodsmith et al. |
| 2005/0147481 A1 | 7/2005 | Wojciechowski et al. |
| 2006/0251489 A1 | 11/2006 | Denham et al. |
| 2008/0107499 A1 | 5/2008 | Denham et al. |
| 2009/0056403 A1 | 3/2009 | Chanko |
| 2012/0142440 A1 | 6/2012 | Babej et al. |
| 2012/0219377 A1 | 8/2012 | Pamer et al. |
| 2013/0149067 A1 * | 6/2013 | Shinjo .................... F16B 37/04 411/180 |
| 2013/0185917 A1 | 7/2013 | Diehl et al. |
| 2013/0185921 A1 | 7/2013 | Diehl et al. |
| 2013/0302107 A1 | 11/2013 | Burton |
| 2013/0327453 A1 | 12/2013 | Takacs et al. |
| 2014/0338802 A1 | 11/2014 | Okita et al. |
| 2015/0023762 A1 | 1/2015 | Pamer et al. |
| 2015/0167727 A1 | 6/2015 | Burton |
| 2015/0322994 A1 * | 11/2015 | Mangapora ........... F16B 37/065 411/180 |
| 2016/0221069 A1 | 8/2016 | Diehl et al. |
| 2016/0298204 A1 | 10/2016 | Thomas |
| 2020/0217350 A1 * | 7/2020 | Donovan ............. F16B 37/068 |

FOREIGN PATENT DOCUMENTS

| | | |
|---|---|---|
| DE | 102012012518 A1 | 12/2013 |
| DE | 10213218605 A1 | 3/2015 |
| EP | 2618009 B1 | 6/2016 |
| EP | 2618010 B1 | 6/2016 |
| GB | 2401661 B | 11/2004 |
| JP | 2005515379 A | 5/2005 |
| KR | 1020140073388 A | 6/2014 |

OTHER PUBLICATIONS

Written Opinion completed Apr. 14, 2020 in corresponding application PCT/US2019/041797, 7 pages.

* cited by examiner

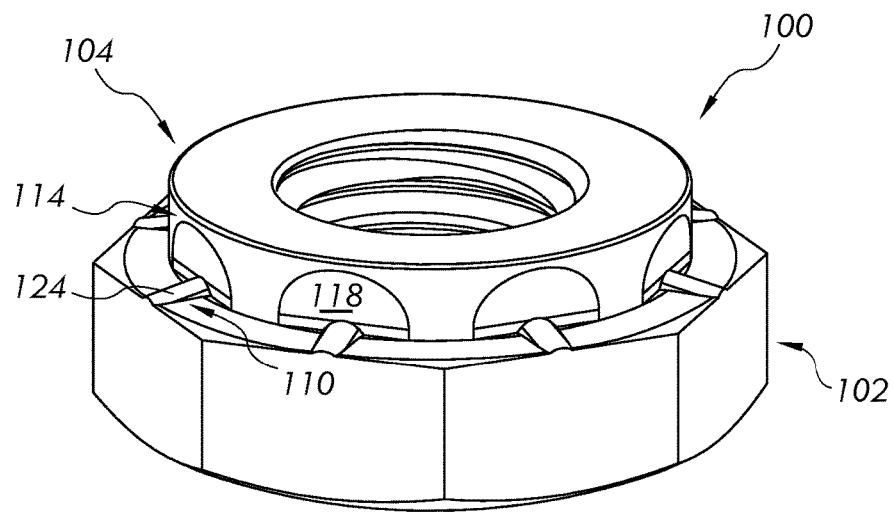
FIG. 7A
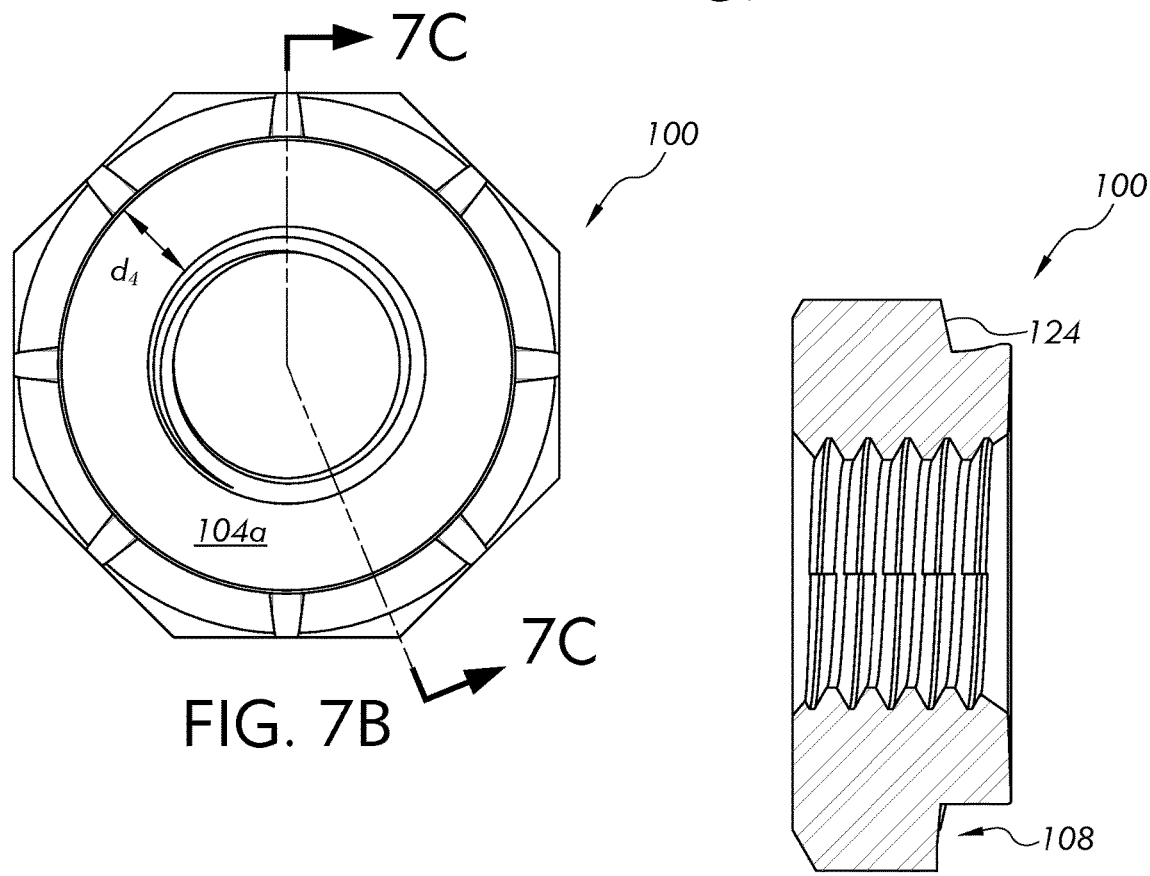
FIG. 7B
FIG. 7C

SELF-CLINCHING FASTENER

CROSS-REFERENCE TO RELATED APPLICATIONS

None

FIELD OF THE INVENTION

This application relates generally to self-attaching fasteners, and more particularly, clinch nuts.

BACKGROUND OF THE INVENTION

Self-attaching fasteners are used in many industries such as, for example, the automotive and appliance industries to secure various components to metal panels. When clinch nuts are attached to the metal panels, screws or bolts are threaded into the clinch nuts and tightened to prescribed torque values. During installation, the clinch nuts must have sufficient rotational resistance to keep them from rotating relative to the metal panels when the screws are inserted and tightened. During service, the clinch nuts must have sufficient pull-through resistance to keep them from pulling out of the metal panel when external forces such as, for example, vibration or other tensile forces are applied.

A clinch nut typically includes a central pilot or punch portion which at least partially extends into an opening in a metal plate or panel. When the clinch nut is self-piercing, the central pilot portion cooperates with tooling to form the opening in the metal panel when attaching the clinch nut to the metal panel. The clinch nut is attached to the metal panel by a die member which forms a mechanical interlock between the clinch nut and the metal panel. The die member typically deforms the metal panel about the opening into an annular groove of the clinch nut which encircles the pilot portion and/or deforms the pilot portion of the clinch nut over the metal panel to entrap the metal panel.

For example, U.S. Pat. No. 3,053,300 discloses a clinch nut having a central pilot portion which extends through a pre-formed opening in a metal panel and is folded over to stake the periphery of the opening. The deformation of the central pilot forces the metal panel to conform to an undulating surface of the annular groove and to form the interlock between the clinch nut and metal panel. While this clinch nut may have a relatively high pull-out resistance, the deformation of the central pilot can easily distort the internal threads of the clinch nut.

One approach to eliminate distortion of the internal threads when deforming the pilot is to deform the metal panel to form the interlock rather than the pilot of the clinch nut. For example, U.S. Pat. Nos. 3,878,599 and 4,690,599 each disclose a clinch nut having an undercut on either the inner or outer wall of the groove. Material of the metal panel is forced into the undercut to improve the interlock formed between the clinch nut and the metal panel. With relatively thin metal panels, however, very little material is forced into the undercut, resulting in a relatively low pull-out resistance.

One approach to increase the pull-out resistance of clinch nuts of this type is to form a double-undercut groove. For example, U.S. Pat. No. 5,340,251 discloses a clinch nut having undercuts in both the inner and outer walls so that the annular groove is "dove-tail" shaped in cross section. The metal panel is forced into both of the undercuts to form an improved interlock between the clinch nut and metal panel. The deformation of the metal panel required to fill both undercuts, however, is difficult to obtain using conventional forming techniques, resulting in inconsistent pull-out resistance.

Yet another approach to enhance push-out resistance and torque-out resistance of clinch nuts of this type is to form lugs, on an annular shaped surface, that have planar or flat faces. For example, U.S. Pat. No. 6,220,804 discloses a clinch nut having lugs with a rectangular cross-sectional shape. The lugs are preferably recessed below an outer annular lip of the body of the clinch nut. The metal panel is plastically deformed into the recessed areas defined between the lugs in order to provide an improved joint connection. In yet a further approach, the lugs are provided with a recessed portion to further enhance the interlock between the clinch nut and the metal panel. For example, U.S. Pat. No. 9,322,424 discloses a clinch nut having lugs with a central recessed portion. Specifically, each lug includes angled sidewalls configured to guide the plastically deforming metal panel into the central recessed portion during installation.

Due to technological advancements made in the automotive industry, it is a current trend that manufacturers are selecting materials that will both reduce the overall weight of the finished product and provide the same, or greater, strength properties. Specifically, new, lightweight materials, having enhanced strength as a result of a treatment process (e.g., heat treating), are now being used to manufacture the metal panels in order to reduce the weight of the finished product. For example, conventional metal panels had a substrate hardness that was less than or equal to 500 Mpa. The new metal panels are manufactured to have a substrate hardness within a range of 500-2000 Mpa. The above-noted self-clinching fasteners typically do not function well with these new metal panels. Specifically, the materials selected for manufacturing conventional metal panels have high flow rates during plastic deformation. That is, when plastic deforming, the previous material would elongate and expand much easier and thus be able to fill in gaps/cavities created by the above-noted lugs. However, the new, lightweight materials have limited elongation availability. That is, the new metal panels do not plastically deform (i.e., flow) as easily as the conventional metal panels. As such, the configurations of the above-noted self-clinching fasteners are inapt for successful attachment and/or long-term use with the new metal panels formed of lightweight materials that are strength enhanced.

Accordingly, there is a need in the art for an improved clinch nut which can be reliably and consistently attached to a thin metal panel, formed from lightweight materials, having sufficient push-out strength, sufficient rotational resistance, and without having distortion of the internal treads. Furthermore, there is a need for the clinch nut to be relatively inexpensive to produce and relatively easy to use.

BRIEF SUMMARY OF THE INVENTION

In accordance with one aspect, there is provided a self-clinching fastener for attachment to a plastically deformable metal substrate. The self-clinching fastener includes a body portion with a central axis. The body portion has an outer peripheral surface that extends in a direction of the central axis, and an annular-shaped surface that extends in a direction perpendicular to the central axis. A punch portion is coaxial with the central axis and extends from the body portion such that the annular-shaped surface encircles the punch portion. The punch portion has an outer peripheral surface that extends in the direction of the central axis. A plurality of spaced apart lugs encircle the punch portion and axially project outwards from the annular-shaped surface. One of the lugs has a contact face that is configured to engage the metal substrate. The contact face declines, relative to an imaginary horizontal plane on which the annular-shaped surface lies, in a radially outwards direction of the self-clinching fastener.

In accordance with another aspect, there is provided a self-clinching fastener for attachment to a plastically deformable metal substrate. The self-clinching fastener includes a body portion with a central axis. The body portion has an annular-shaped surface extending in a direction perpendicular to the central axis. A punch portion is coaxial with the central axis of the body portion and extends from the body portion such that the annular-shaped surface encircles the punch portion. The punch portion includes an outer peripheral surface that extends in a direction of the central axis. The outer peripheral surface of the punch portion has a cylindrical profile and includes a plurality of spaced apart cutouts that encircle the punch portion, and a plurality of spaced apart columns portions that encircle the punch portion. Each of the column portions is disposed between and spaces apart a respective pair of adjacently spaced apart cutouts.

In accordance with yet another aspect, there is provided a self-clinching fastener for attachment to a plastically deformable metal substrate. The self-clinching fastener includes a body portion with a central axis. The body portion includes an outer peripheral surface that extends in a direction of the central axis, and an annular-shaped surface that extends in a direction perpendicular to the central axis. A punch portion is coaxial with the central axis and extends from the body portion such that the annular-shaped surface encircles the punch portion. The punch portion has an outer peripheral surface that extends in a direction of the central axis. The outer peripheral surface of the punch portion has a cylindrical profile and includes a plurality of spaced apart cutouts encircling the punch portion and a plurality of spaced apart column portions that encircle the punch portion. Each of the column portions is disposed between and spaces apart a respective pair of adjacently spaced apart cutouts. The self-clinching fastener further includes a plurality of spaced apart lugs that encircle the punch portion and axially project outwards from the annular-shaped surface. Each lug is radially aligned with a respective one of the plurality of cutouts. One of the lugs includes a contact face configured to engage the metal substrate. The contact face declines, relative to an imaginary horizontal plane on which the annular-shaped surface lies, in a radially outwards direction of the self-clinching fastener.

BRIEF DESCRIPTION OF THE DRAWINGS

FIG. 7A is another perspective view of the clinch nut shown in FIG. 1;
FIG. 7B is a top view of the clinch nut depicted in FIG. 7A;
FIG. 7C is a sectional view taken along the line 7C-7C in FIG. 7B.

DESCRIPTION OF EXAMPLE EMBODIMENTS

Figure 1:
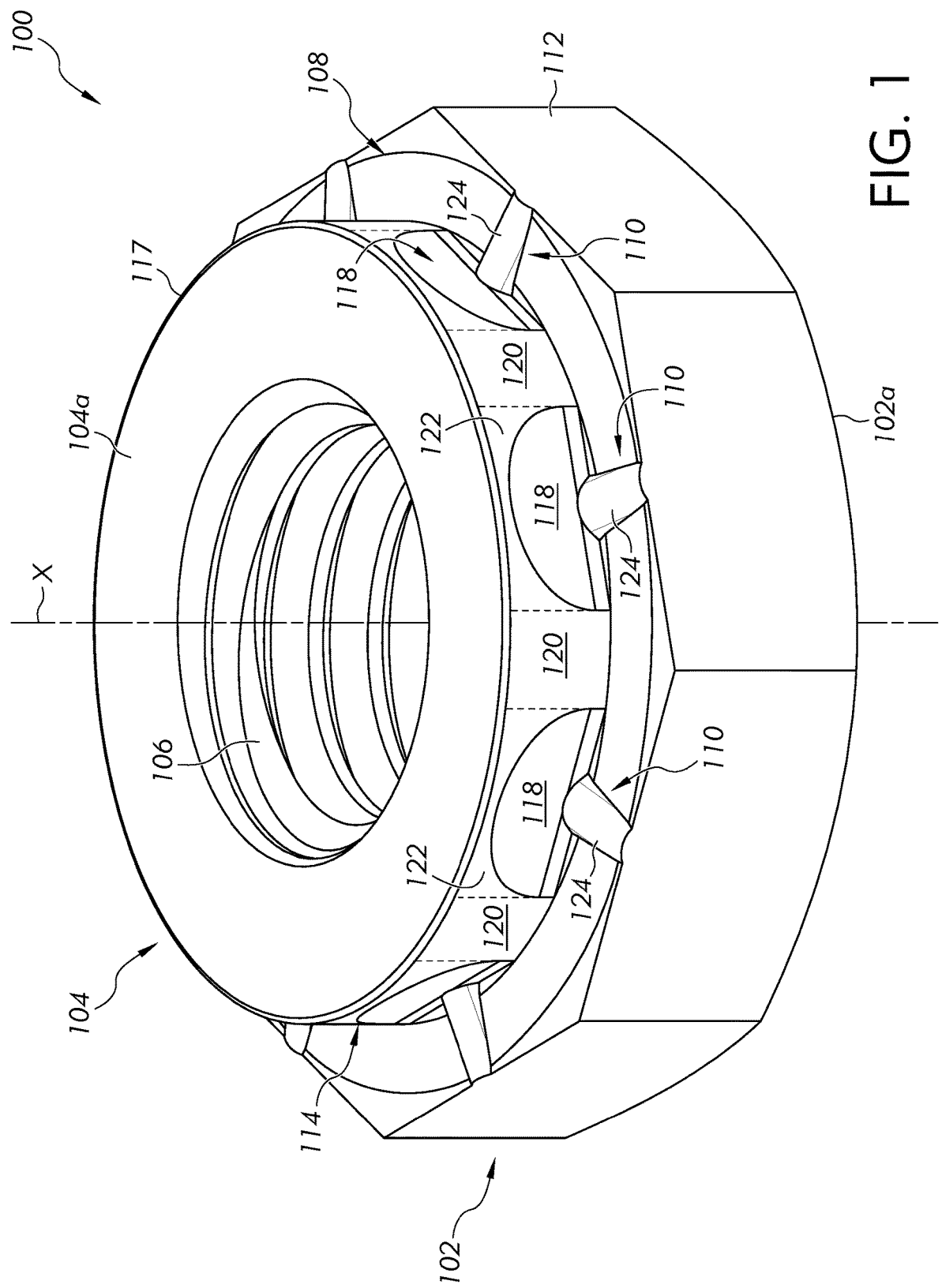
FIG. 1 is a perspective view of a clinch nut.
Figure 8:
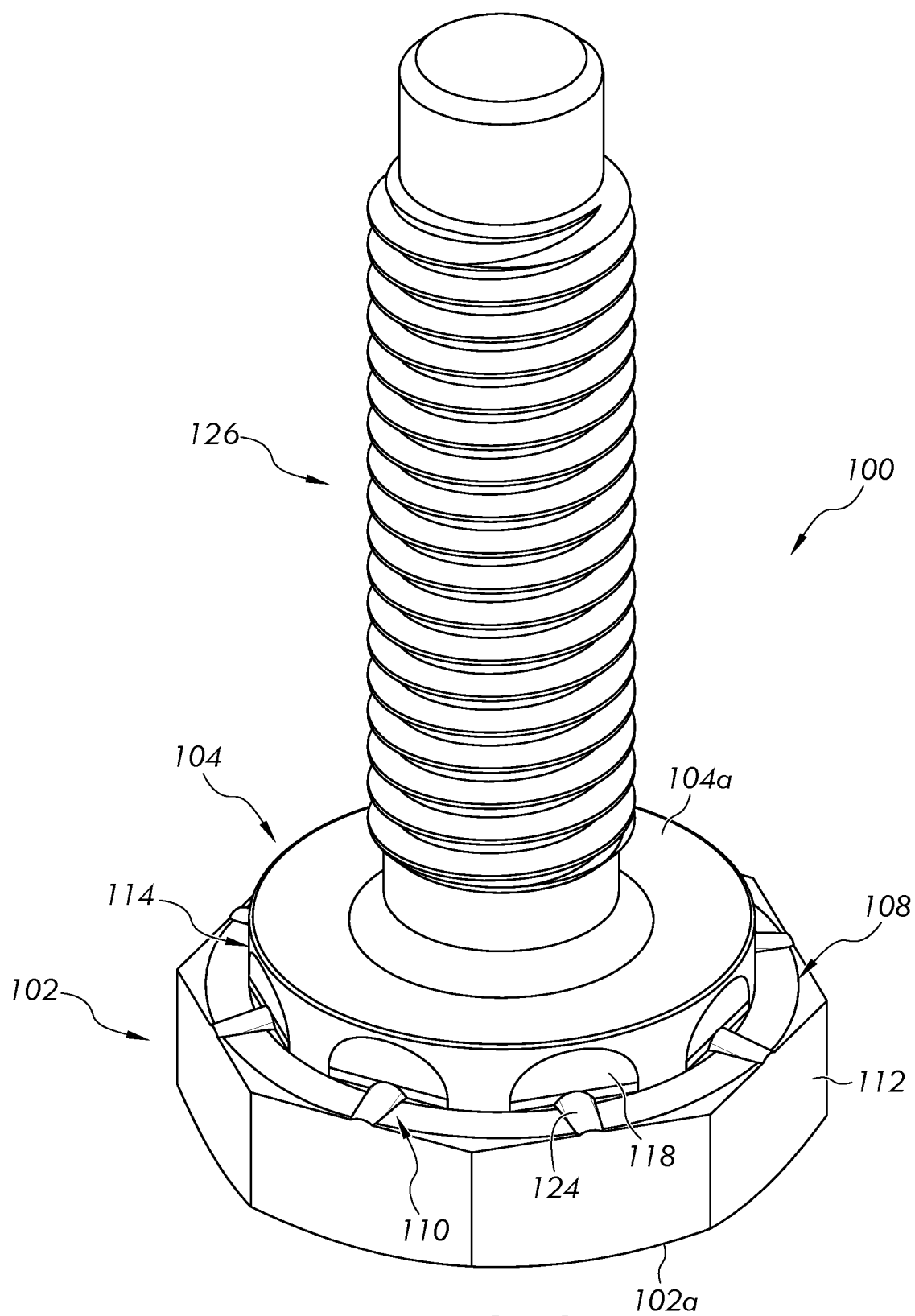
FIG. 8 is a perspective view of a stud including a clinch mounting portion as shown in FIG. 1.

Referring now to the drawings, FIG. 1 depicts a fastener 100 or nut for attachment to a plastically deformable metal plate or panel. The fastener 100 may be a self-clinching fastener that, during installation to the metal panel, clinches and attaches to a pre-made hole formed in the metal panel. Preferably, the fastener 100 is a self-piercing and self-clinching fastener that, during installation, both pierces an aperture in the metal panel and clinches itself thereto. It is noted that while the illustrated embodiment is a nut, other self-piercing and self-clinching fasteners such as, for example, self-piercing and/or self-clinching studs (depicted in FIG. 8, and briefly discussed below) are within the scope of the present invention. For brevity, a majority of the below-description will be made with respect to a self-clinching and self-piercing nut, with the understanding that this disclosure likewise applies to self-piercing and/or self-clinching studs.

The fastener 100 has a body portion 102 and a pilot or punch portion 104 extending from one end of the body portion 102. A threaded hole or bore 106 axially extends through both the body portion 102 and the punch portion 104. Further, the body portion 102 and the punch portion 104 are coaxial with a central axis "X." Upon installation of the fastener 100 to a plastically deformable metal substrate, a mating, threaded fastener (e.g., a bolt, screw, etc.) can be inserted in the threaded bore 106 for attachment thereto. Where the fastener is a self-piercing and self-clinching stud, the punch portion 104 can be solid and contain no through hole; instead, a threaded or non-threaded stud can extend outwards from the opposite side of the body portion 102 (i.e., from bottom or first end surface 102a of the fastener 100). Preferably such a stud is located centrally and co-axially with the central axis "X." The stud could be perpendicular to the first end surface 102a, or may be positioned at an angle relative to the central axis "X," as desired.

Figure 2:
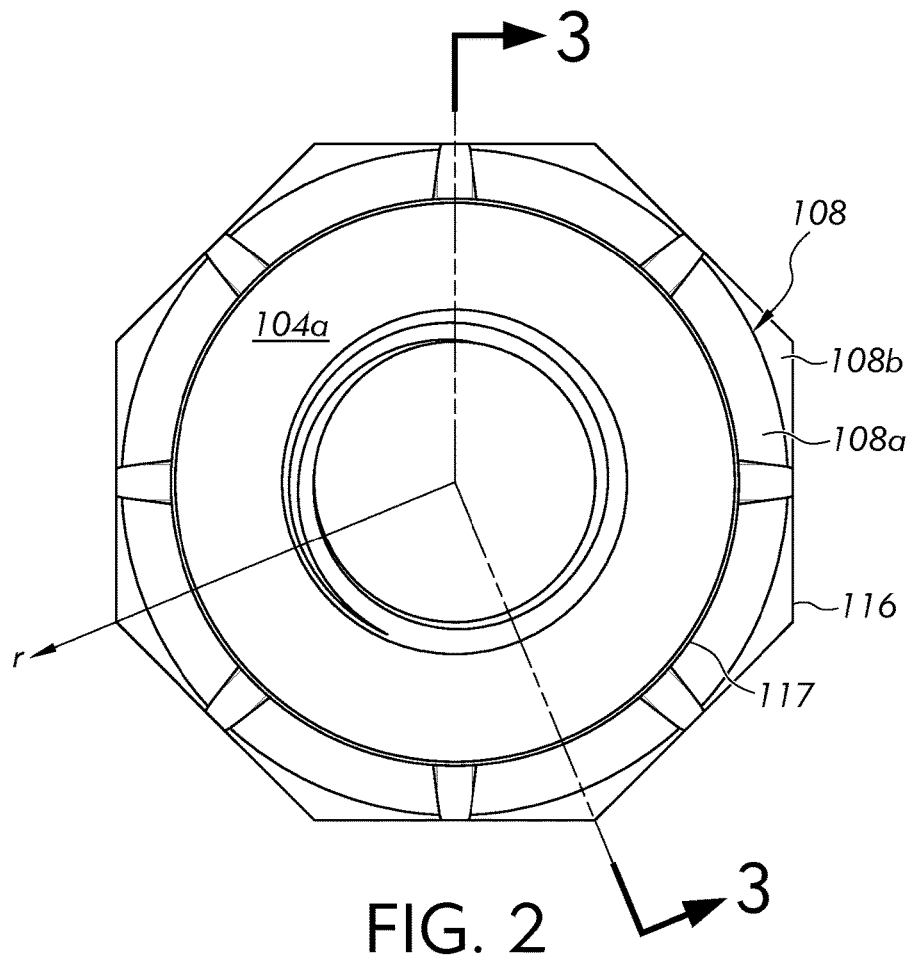
FIG. 2 is a top view of the clinch nut depicted in FIG. 1.
Figure 3:
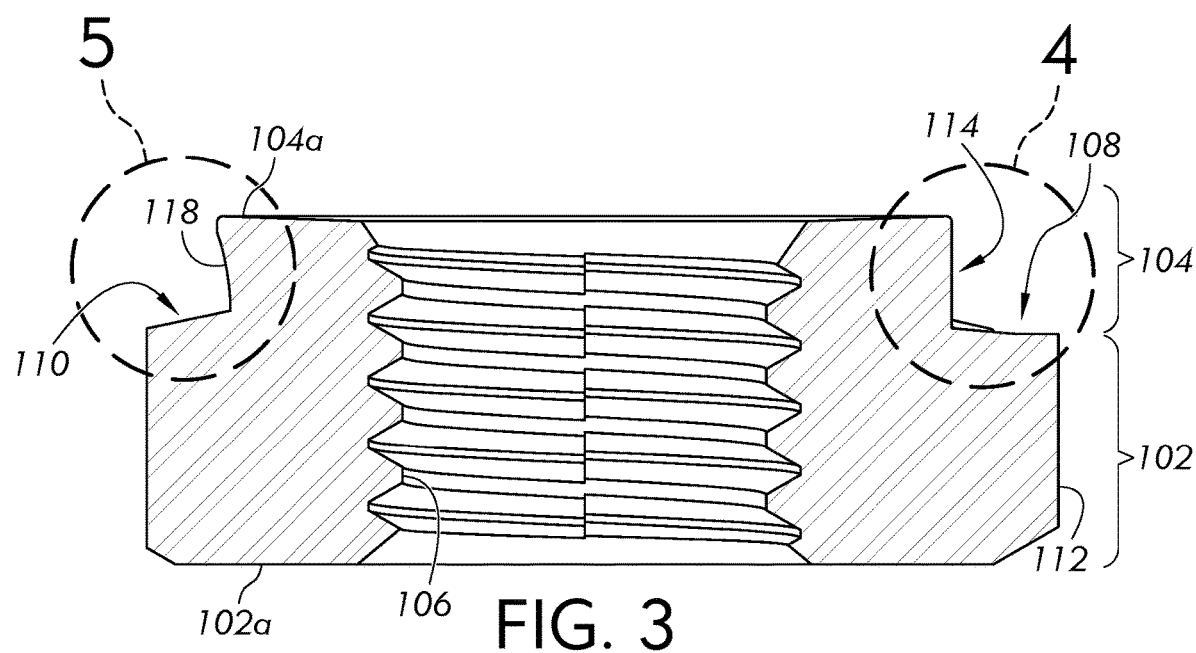
FIG. 3 is a sectional view taken along the line 3-3 in FIG. 2.

With reference to FIGS. 1-3, the body portion 102 extends to the bottom or first end surface 102a of the fastener 100, corresponding to one axial extremity of the fastener 100. The first end surface 102a of the fastener 100 is shown as being substantially perpendicular to the central axis "X." However, the first end surface 102a may have other geometric configurations; for example, the first end surface 102a may be chamfered. Specifically, the first end surface 102a may be inclined or declined with respect to the central axis "X." Said differently, the first end surface 102a may have a circumferential face that gradually converges radially inwards or diverges radially outwards with respect to an installation direction of the fastener 100. As is further shown, the punch portion 104 extends to a top or second end surface 104a of the fastener 100, corresponding to the other axial extremity of the fastener 100. The second end surface 104a of the fastener 100 is likewise depicted as being substantially perpendicular to the central axis "X," however, the second end surface 104a could alternatively be chamfered, as described above with respect to the first end surface 102a.

The punch portion 104 is radially smaller than the body portion 102 such that the body portion 102 includes a generally annular-shaped surface 108 encircling the punch portion 104. That is, the punch portion 104 extends from the body portion 102 in a direction of the central axis "X," and is positioned such that the annular-shaped surface 108 encircles the punch portion 104. The annular-shaped surface 108 extends in a direction perpendicular to the central axis (i.e., extending in a radial direction "r" of the fastener 100, see FIG. 2) and is configured to engage the metal panel to which the fastener 100 is to be attached to.

As is further shown, the fastener 100 includes a plurality of spaced apart lugs 110 that collectively encircle the punch portion 104. Each of the lugs 110 axially projects outward from the annular-shaped surface 108 in a direction opposite to the first end surface 102*a* of the fastener 100. In one embodiment, as shown, the plurality of lugs 110 are equally spaced apart, one from the other, and all have the same configuration. Alternatively, the plurality of lugs 110 can be unequally spaced apart about the punch portion 104, one from the other, and/or can have varying configurations.

With respect to FIGS. 1 and 3, the body portion 102 and punch portion 104 include outer peripheral surfaces 112, 114, respectively, that extend in a direction of the central axis "X." In one embodiment, the outer peripheral surface 112 of the body portion 102 is planar and parallel with respect to the central axis "X" to provide a polygonal shape having flat sides which can be readily used by machine tools. Alternatively, the outer peripheral surface 112 of the body portion 102 may be curved with a convex or concave shape and/or non-parallel with respect to the central axis "X." In the shown example, the outer peripheral surface 112 of the body portion 102 is polygonal-shaped and is formed by a plurality of faces. Specifically, the plurality of faces all have the same dimensions (i.e., height and width) such that the outer peripheral surface 112 of the body portion 102 is formed by eight faces, as shown in FIG. 2. Alternatively, a total of four to twelve faces may form the outer peripheral surface 112 of the body portion 102. It is further noted that the outer peripheral surface 112 of the body portion 102 need not be polygonal-shaped, and may have other geometric configurations (e.g., cylindrical). The height (i.e., the axial dimension) and width (i.e., the radial dimension) of the body portion 102 are selected to provide sufficient thread engagement between the threaded bore 106 and the mating externally threaded member (e.g., a bolt) such that the mating externally threaded member may consistently engage with and break from the threaded bore 106, without stripping the threads. Where the fastener 100 has a self-clinching stud, the height and width of the body portion 102 can be likewise selected to provide sufficient strength for the stud and any intended mating fasteners.

Figure 4:
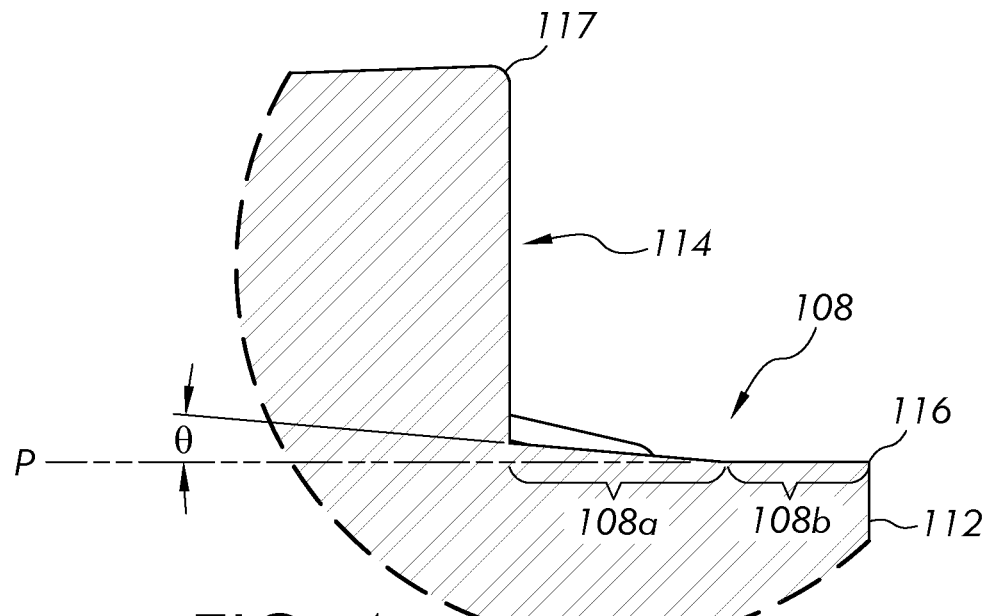
FIG. 4 is an enlarged view of detail area "4" depicted in FIG. 3.

With reference to FIGS. 2 and 4, FIG. 4 being an enlarged detail view of an encircled area of the fastener 100 depicted in FIG. 3, the annular-shaped surface 108 lies on an imaginary horizontal plane "P." Specifically, the imaginary horizontal plane "P" is configured such that the central axis "X" is normal thereto. Further, the annular-shaped surface 108 comprises a first annular face 108*a* and a second annular face 108*b*. The first annular face 108*a* is encircled by the second annular face 108*b* (i.e., the first annular face 108*a* is positioned radially closer to the punch portion 104 than the second annular face 108*b*).

An outer radius (with respect to the central axis "X") of the second annular face 108*b* meets with (i.e., intersects) the outer peripheral surface 112 of the body portion 102 at a peripheral edge 116 of the annular-shaped surface 108. An inner radius (with respect to the central axis "X") of the second annular face 108*b* meets with an outer radius (with respect to the central axis "X") of the first annular face 108*a*, and an inner radius (with respect to the central axis "X") of the first annular face 108*a* meets with (i.e., intersects) the outer peripheral surface 114 of the punch portion 104.

In particular, the second annular face 108*b* can lie on the imaginary horizontal plane "P" and the first annular face 108*a* can be angled with respect to the imaginary horizontal plane "P." Specifically, the first annular face 108*a* can be convex shaped with respect to the imaginary horizontal plane "P." That is, the first annular face 108*a* inclines, relative to the imaginary horizontal plane "P," in a radially inwards direction of the fastener 100. The first annular face 108*a* has a convex angle θ (i.e., an angle less than 180°, with respect to the imaginary horizontal plane "P") within a range of 2°-10°, with respect to the imaginary horizontal plane and, as shown in FIG. 4, preferably has a convex angle θ of 5°.

This convex angle θ provides the technical advantage of generating a suitable surface to which the metal panel can engage with during attachment. Specifically, conventional fasteners have a concave angle provided between an annular-shaped surface and an imaginary horizontal plane. Such a configuration is acceptable for previously configured metal panels. However, as mentioned above, metal panels are now being manufactured from new, lightweight materials (e.g., aluminum, steel, etc.) that are enhanced (e.g., heat treated) to provide improved strength qualities. While these new metal panels are thinner, lighter and stronger, the relatively harder substrates of such metal panels permit less material elongation during installation. That is, the substrate (i.e., the metal panel) does not flow (i.e., plastically deform) easily during fastener installation, thus resulting in gaps (i.e., empty spaces) forming between the punch portion and/or annular-shaped surface, and the mating substrate (i.e., the metal panel). These gaps or voids deteriorate the attachment strength between the fastener and the metal panel, ultimately yielding an unsatisfactory joint connection therebetween. The fastener 100 configuration discussed herein, and specifically the configuration of the above-noted convex angle, greatly reduces or even eliminates the potential voids formed between the fastener 100 and the metal panel. That is, the substrate no longer needs to flow into an undercut region formed via an angle between the annular-shaped surface and the outer peripheral edge of the punch portion.

Moving back to FIG. 1, the outer peripheral surface 114 of the punch portion 104 extends in the direction of the central axis "X" between the annular-shaped surface 108 of the body portion 102 and a distal peripheral edge 117 of the punch portion 104 (i.e., an edge where the second end surface 104*a* and the outer peripheral surface 114 of the punch portion 104 intersect). Further, the outer peripheral surface 114 of the punch portion 104 has a cylindrical profile. That is, the outer peripheral surface 114 of the punch portion 104 preferably has radiused corners which collectively yield a rounded surface. Said differently, the outer peripheral surface 114 preferably has no sharp edges that extend beyond an imaginary circumferential plane "C" (shown in FIG. 5) that bounds (i.e., encircles) the outer peripheral surface 114 of the punch portion 104.

The outer peripheral surface 114 of the punch portion 104 having a cylindrical profile with no sharp edges greatly reduces or even eliminates the potential for imperfections (e.g., cracking) to form in the fastener 100 and/or the metal panel during installation. As noted above, because metal panels are now manufactured from relatively stronger, harder materials (e.g., hot-formed steel), the substrate does not flow (i.e., plastically deform) easily during installation.

As such, sharp or pointed edges on the outer peripheral surface 114 of the punch portion 104 are susceptible to cracking due to the forces imparted thereon during installation. Accordingly, the fastener 100 described herein, having no sharp or pointed edges on the outer peripheral surface 114 of the punch portion 104, is removed from the above-noted problem and is less likely to yield a defective finished product.

As shown, a plurality of spaced apart cutouts 118 are formed in the outer peripheral surface 114 of the punch portion 104 and are arranged so as to collectively encircle the punch portion 104. In one embodiment, the plurality of cutouts 118 are equally spaced apart, one from the other, and all have the same configuration. Specifically, each cutout 118 has a concaved surface with respect to the outer peripheral surface 114 of the punch portion 104. Alternatively, the plurality of cutouts 118 can have varying spacing and/or configurations, such as where only one cutout 118 has a concaved surface.

The outer peripheral surface 114 of the punch portion 104 further comprises a plurality of spaced apart column portions 120, shown in FIG. 1 in dashed lines, wherein each column portion 120 is defined as an area of the cylindrically profiled outer peripheral surface 114 of the punch portion 104 between a pair of adjacently spaced cutouts 118. The plurality of spaced apart column portions 120 collectively encircle the punch portion 104, and each column portion 120 extends from the annular-shaped surface 108 to the distal peripheral edge 117 of the outer peripheral surface 114 of the punch portion 104. Specifically, each column portion 120 is disposed between and spaces apart a respective pair of adjacently spaced apart cutouts 118.

As mentioned above, in one embodiment, the plurality of cutouts 118 are shown as being equally spaced apart, one from the other. Specifically, it is the plurality of column portions 120 that provide the equal spacing between the plurality of cutouts 118. As such, the plurality of column portions 120 are likewise equally spaced, one from the other. As further mentioned above, the outer peripheral surface 114 of the punch portion 104 has a cylindrical profile with no sharp edges; this is a result of the column portions 120 being disposed between and spacing apart a respective pair of adjacently spaced apart cutouts 118. That is, if a pair of cutouts 118 were disposed directly adjacent one another, with nothing therebetween, there would be no surface having a cylindrical profile provided between the pair of adjacent cutouts 118, thus resulting in the formation of a sharp edge.

Still further, in one embodiment, the outer peripheral surface 114 of the punch portion 104 comprises a plurality of bridge portions 122 that are spaced apart, one from the other, and which collectively encircle the punch portion 104. Specifically, each bridge portion 122 is defined as an area of the cylindrically profiled outer peripheral surface 114 of the punch portion 104 disposed between a pair of adjacently spaced column portions 120. Further, each bridge portion 122 is positioned axially between the distal peripheral edge 117 of the outer peripheral surface 114 of the punch portion 104 and the cutout 118 which is bounded by the pair of adjacently spaced column portions 120. In this manner, each bridge portion 122 connects a respective pair of adjacently spaced apart column portions 120.

Figure 5:
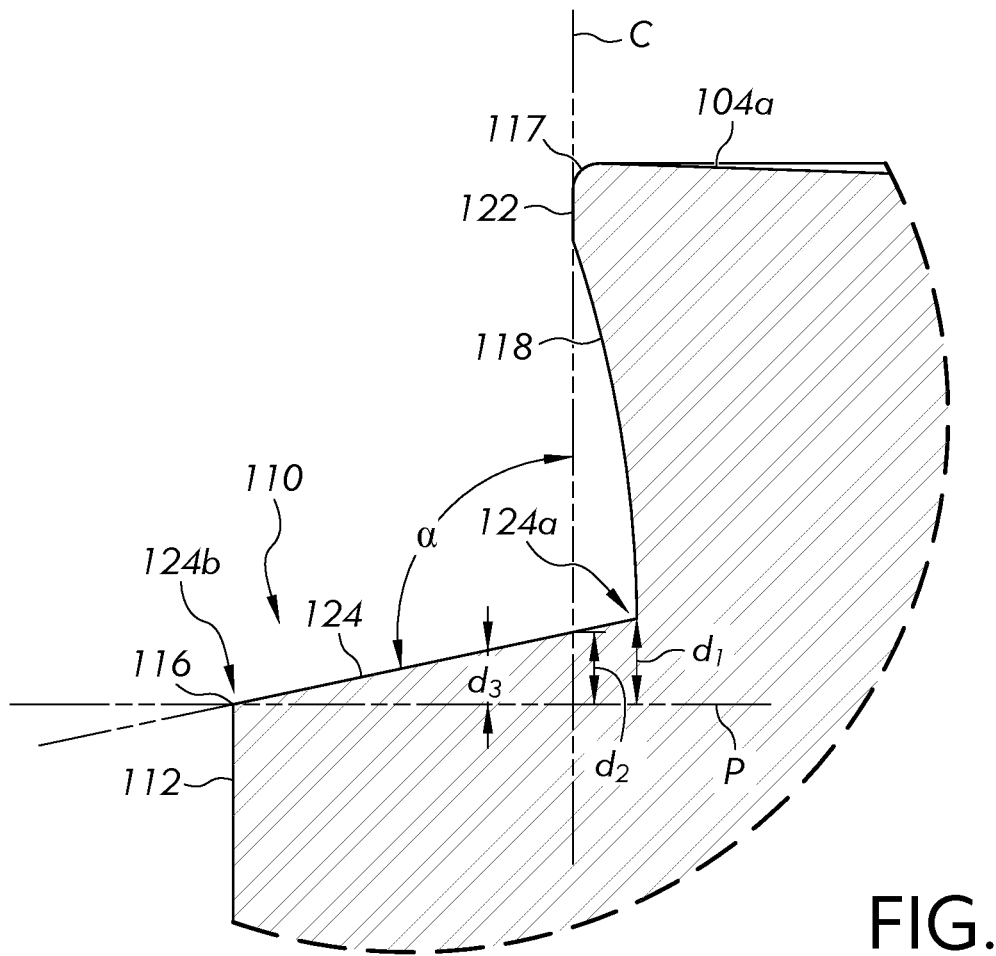
FIG. 5 is an enlarged view of detail area "5" depicted in FIG. 3.

Moving on to FIG. 5, one of the lugs 110 has a contact face 124 with a rounded profile (as shown in FIG. 1). That is, the contact face 124 is curved (i.e., rounded laterally, side-to-side) with respect to an imaginary axis extending in the radial direction "r" of the fastener 100. Preferably, the relatively highest point of the contact face 124 (relative to the imaginary horizontal plane "P") is at its midpoint, although other geometries are contemplated. In one embodiment, the contact face 124 is configured to engage the metal panel to which the fastener 100 is to be attached to, and declines, relative to the imaginary horizontal plane "P," in a radially outwards direction of the fastener 100. As shown in the depicted embodiment, the contact face declines in a continuous manner relative to the imaginary horizontal plane "P," in the radially outwards direction of the fastener 100. This specific configuration (i.e., the contact face 124 continuously declining in a radially outward direction) generates a satisfactory mating surface for the metal panel. That is, as noted above, because the substrate (i.e., the metal panel) does not flow (i.e., plastically deform) easily during installation, it is important to provide mating surfaces on a fastener that do not require the substrate to flow into cavities and/or voids. As such, the contact face 124 of the fastener 100 described herein permits the substrate to efficiently flow and mate with the annular-shaped surface 108 during installation. Moreover, the configuration of the contact face 124 (i.e., its spatial orientation and having a rounded profile) eliminates the likelihood of the lug 110 being deformed during installation.

The contact face 124 has a first end portion 124a and a second end portion 124b. The first end portion 124a is positioned adjacent the outer peripheral surface 114 of the punch portion 104 and the second end portion 124b is positioned radially outwards therefrom. Preferably, the first end portion 124a is formed with the outer peripheral surface 114 of the punch portion 104 and the second end portion 124b is located at the peripheral edge 116 of the annular-shaped surface 108 and possibly co-terminus with the outer peripheral surface 112 of the body portion 102.

As noted above, in one embodiment the contact face 124 continuously declines, relative to the imaginary horizontal plane "P," in a radially outwards direction of the fastener 100. This is a result of a surface of the contact face 124, at the first end portion 124a, being spaced a first distance d1 from the imaginary horizontal plane "P" in a direction that is normal to the imaginary horizontal plane "P," and wherein the first distance $d_1$ is greater than any other distance (e.g., $d_2$ or $d_3$) between the contact face 124 and the imaginary horizontal plane "P" taken in the direction that is normal to the imaginary horizontal plane "P." As is further shown, an angle α between the contact face 124 and the outer peripheral surface 114 of the punch portion 104 is obtuse (i.e., the angle is greater than 90° and smaller than 180°).

In one embodiment, each of the plurality of lugs 110 can have the same configuration, as depicted in FIG. 1. As further shown, each lug 110 is radially aligned with one of the cutouts 118. In this manner, the first end portion 124a of each lug 110 is formed with the cutout 118 that said lug 110 is radially aligned with. Moreover, the total number of radially aligned lugs 110 and cutouts 118 can depend on the total number of faces of the outer peripheral surface 112 of the body portion 102 and can each be radially aligned therewith. That is, for example, in FIGS. 1 and 2, the fastener 100 comprises a total of eight faces that collectively construct the outer peripheral surface 112 of the body portion 102. In this manner, the fastener 100 further comprises a total of eight lugs 110 and cutouts 118, each, that are radially aligned with a respective one of the eight faces that makes up the outer peripheral surface 112 of the body portion 102. Alternatively, the total number of lugs 110 can be different than the total number of cutouts 118 and/or faces of the outer peripheral surface 112 of the body portion 102.

Moreover, the lugs 110, cutouts 118 and/or the faces of the outer peripheral surface 112 of the body portion 102 need not be radially aligned. For example, one lug 110 could be radially aligned with an edge formed between a pair of adjacent faces of the outer peripheral surface 112 of the body portion 102.

All of the components of the above-discussed fastener 100, specifically the body portion 102, the punch portion 104, and the lug(s) 110, are formed integrally with respect to one another. That is, the body portion 102, the punch portion 104 and the lug(s) 110 are all formed from the same stock material. For example, the fastener 100 can be manufactured from treated steal, and specifically from 10B21 steel. However, the material selection is not limited to 10B21 steel, and other suitable materials may be used. Furthermore, it is preferable for the material of the fastener 100 to have a hardness greater than that of the metal panel to which it is to be attached to. Where the fastener is a self-clinching stud, the stud would likewise be integrally formed of the same material.

With reference to FIGS. 6A-6C and 7A-7C, a comparison will now be made between a conventional fastener 100' (depicted in FIGS. 6A-6C), similar to those discussed in U.S. Pat. Nos. 6,220,804 and 9,322,424, and the new fastener 100 (depicted in FIGS. 7A-7C) discussed above with respect to FIGS. 1-5.

Figure 6A:
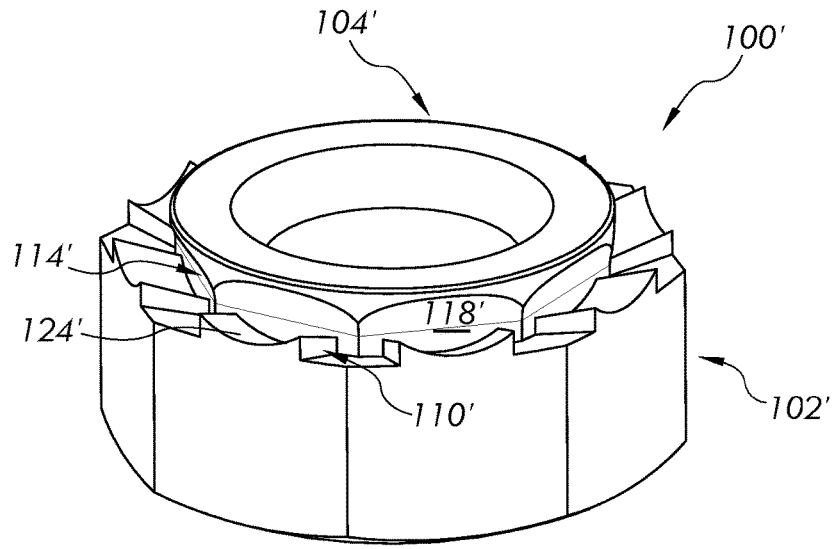
FIG. 6A is a perspective view of a prior art clinch nut.

As shown in FIG. 6A, the punch portion 104' of the conventional fastener 100' has an outer peripheral surface 114' with a sharp profile. That is, the cutouts 118' (or undercut portions) formed on the outer peripheral surface 114' are disposed directly adjacent one another such that the lateral ends of each cutout 118' engages (i.e., intersects) with a respective lateral end of an adjacently arranged cutout 118'. Due to such a configuration, a sharp edge is formed. This configuration is beneficial for installing the conventional fastener 100' into conventional metal panels (i.e., those manufactured from lower tensile grade materials) since those metal panels are more ductile and can flow (i.e., plastically deform) around the sharp edges, without resulting in fracturing or cracking in the finished joint connection. However, as mentioned above, the conventional fasteners 100' are inapt for successful attachment and/or long-term use with the new metal panels, formed of lightweight materials that are strength enhanced.

In comparison, with reference to FIG. 7A, the outer peripheral surface 114 of the punch portion 104 of the new fastener 100 has a rounded profile. That is, the sharp edges noted above with respect to the conventional fastener 100' have been removed (i.e., as a result of the column portions 120 spacing apart a pair of adjacently spaced apart cutouts 118). This yields a 20% reduction in flat surfaces of the punch portion 104 of the new fastener 100. As discussed above, this configuration permits the substrate of the new metal panels (i.e., which have limited elongation availability) to contact and engage the fastener 100 in a manner that provides a successful joint connection therebetween.

Figure 6B:
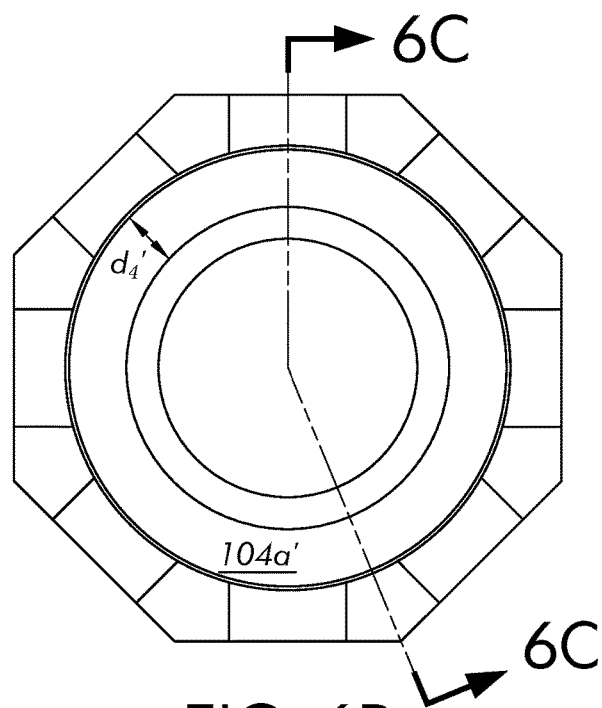
FIG. 6B is a top view of the prior art clinch nut depicted in FIG. 6A.
Figure 6C:
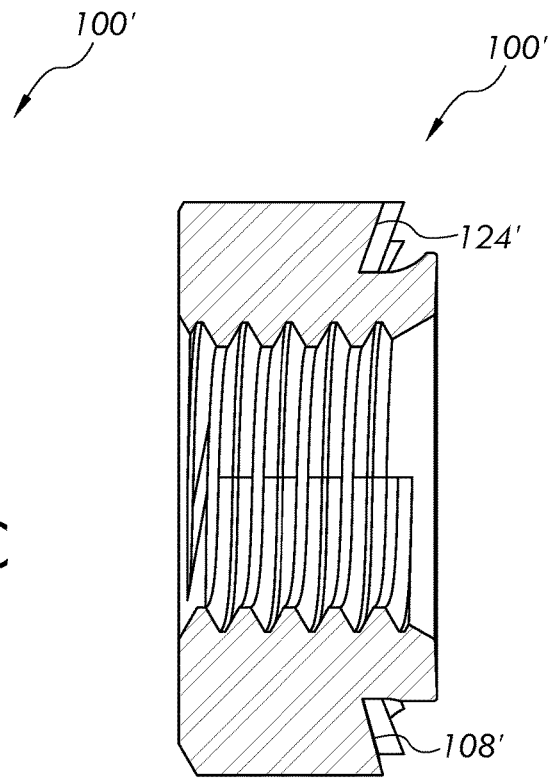
FIG. 6C is a sectional view taken along the line 6C-6C in FIG. 6B.

Moving back to FIGS. 6A and 6C, the conventional fastener 100' includes lugs 110' with a profile that is optimum for the conventional metal panels. That is, each of the lugs 110' has sharp edges and a contact surface 124' that is concaved (e.g., trough shaped) so as to direct a flow of the substrate (i.e., during plastic deformation) towards a central recessed area of the contact surface 124' and towards a base of the punch portion 104'. As mentioned above, this configuration does not perform well with the new, lightweight metal panels. Specifically, there is a tendency for the lugs 110' to deform and/or fail to puncture the mating substrate during installation.

With respect to FIGS. 7A and 7C, the lugs 110 of the new fastener 100 are inversed with respect to those of the conventional fastener 100'. That is, each of the lugs 110 has a contact face 124 with a first end portion 124a (disposed adjacent the outer peripheral surface 114 of the punch portion 104) that is higher than any other portion of the contact surface. In this manner, each lug 110 guides a flow of the substrate (i.e., during plastic deformation) in a radially outwards direction with respect to the central axis "X." Moreover, each lug 110 has a rounded profile (i.e., the sharp corners/edges of the conventional fastener 100' have been removed). Further still a total volume (i.e., height, width, and length) of each lug 110 has been reduced by 80% with respect to the lugs 110' of the conventional fastener 100'. These changes substantially reduce and/or eliminate the probability of the lugs 110 deforming during installation.

Moving now to FIG. 6B, the second end surface 104a' of the conventional fastener 100' has a distance $d_{4'}$. That is, the distance $d_{4'}$ is the difference between the radius of the second end surface 104a' at the distal peripheral edge 117', and the radius of the second end surface 104a' at an inner peripheral edge. In comparison, the second end surface 104a of the new fastener 100 (discussed above) has a relatively larger distance $d_4$. The relatively smaller distance $d_4'$ of the conventional fastener 100' is optimum for generating smaller piercing loads into the conventional metal panels (i.e., those manufactured from lower tensile materials). However, such a configuration does not provide the column strength to successfully pierce the new metal panels (i.e., those having higher strength properties). In further comparison, the diameter of the second end surface 104a (i.e., taken at the distal peripheral edge 117) of the new fastener 100 has increased in 18% from that of the conventional fastener 100', and the distance $d_4$ of the second end surface 104a has increased in total area by 35%, with respect to that of the conventional fastener 100'. These changes provide the new fastener 100 with the necessary column strength to successfully pierce the new metal panels.

With respect to FIG. 6C, the annular shaped surface 108' of the conventional fastener 100' has a concaved angle (e.g., between 5°-15°) with respect to an imaginary horizontal plane. This concaved angle influences (i.e., guides) the substrate of the conventional metal panels (during installation) to flow towards the base of the punch portion 104' for engagement therewith. This permits the conventional fastener 100' to have a larger pierce application thickness range. However, when installing the conventional fastener 100' in the new metal panels, this concaved angle can result in deformation and cracking forming at the area where the punch portion 104' and the body portion 102' interface. In comparison, and as noted above with respect to FIG. 4, the first annular face 108a of the annular-shaped surface 108 can have a convex angle θ within a range of 2°-10°, with respect to an imaginary horizontal plane and, preferably has a convex angle θ of 5°. This convex angle θ promotes sufficient engagement between the mating material of the new metal panels and the new fastener 100 to achieve optimum joint strength characteristics.

Lastly, with respect to FIGS. 6A and 6C, each cutout 118' of the conventional fastener 100' includes a relatively large undercut. That is, each cutout 118' gradually slopes radially inwards from a top portion to a bottom portion of the cutout 118'. This creates a relatively large cavity for the substrate to flow into during installation, thus resulting in higher push-out and torque-out performance in conventional metal panels. In comparison, the backwards taper of the cutouts 118 on the punch portion 104 of the new fastener 100 have been reduced. Specifically, there is a 25% reduction in the backwards taper of the cutouts 118 of the new fastener 100 with respect to those of the conventional fastener 100'.

The above-noted changes in the new fastener 100 (with respect to the conventional fastener 100') permit much greater torque-out performance after being installed to the new metal panels. Specifically, with reference to Table 1 (shown below), both the conventional fastener 100 and the new fastener 100 were installed to a new, lightweight metal panel, and tests were run to determine torque-out specifications for each. The metal panel used during testing had a substrate hardness of roughly 780 Mpa. As shown, the conventional fastener 100' has an average torque-out specification of 69.8 ft/lbs (94.6 Nm) whereas the new fastener 100 has a relatively greater average torque-out specification of 89.6 ft/lbs (121.5 Nm). This increase in torque-out specification is a result of the above-noted changes made to the new fastener 100, with respect to the conventional fastener 100'.

TABLE 1

| Trial # | Conventional Fastener | | New Fastener | |
|---|---|---|---|---|
| | ft/lbs | Nm | ft/lbs | Nm |
| 1 | 68 | 92.2 | 95 | 128.80 |
| 2 | 74 | 100.3 | 86 | 116.60 |
| 3 | 65 | 88.1 | 91 | 123.40 |
| 4 | 75 | 101.7 | 95 | 128.80 |
| 5 | 70 | 94.9 | 93 | 126.10 |
| 6 | 72 | 97.6 | 82 | 111.20 |
| 7 | 65 | 88.1 | 89 | 120.70 |
| 8 | 65 | 88.1 | 91 | 123.40 |
| 9 | 70 | 94.9 | 80 | 108.50 |
| 10 | 74 | 100.3 | 94 | 127.40 |
| Average | 69.8 | 94.6 | 89.6 | 121.5 |
| Std dev(n-1) | 3.9 | 5.3 | 5.3 | 7.2 |
| Mean-3SD | 58.0 | 78.6 | 73.6 | 99.8 |

Further, the conventional fastener 100' is incapable of meeting current industrial standards with respect to successfully attaching to the new, lightweight metal panels and achieving acceptable torque-out specifications. It is generally agreed upon by well-known consumers who employ self-clinching and self-piercing fasteners in their products that a mean-3 standard deviation ("mean-3 SD") for a material thickness over 1 mm and up to and including 4 mm and having a thread size of M12 is roughly 90 Nm. As shown in Table 1, the conventional fastener 100' has a mean-3SD of 78.6 Nm, which is well below the generally recognized industrial standard. In contrast, the new fastener 100 has a mean-3SD of 99.8 Nm, which meets and exceeds the generally recognized industrial standard. Accordingly, the above-noted changes in the new fastener 100 (with respect to the conventional fastener 100') not only result in improved performance, but also meets a generally recognized industrial standard; something which the conventional fastener 100' is incapable of doing.

Moreover, as briefly noted above and with respect to FIG. 8, the fastener 100 may be a self-piercing and/or self-clinching stud. In such a configuration, the fastener 100 comprises the body portion 102 and the punch portion 104. A shank 126 extends outwards from the second end surface 104a of the fastener 100 along the central axis "X." In other examples, the shank 126 may extend outwards from the first end surface 102a of the fastener 100 along the central axis "X." As shown, at least a portion of the shank 126 may be threaded. Alternatively, the shank 126 may not be threaded.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A self-clinching fastener for attachment to a plastically deformable metal substrate, the self-clinching fastener comprising:
 a body portion with a central axis, the body portion including an annular-shaped surface extending in a direction perpendicular to the central axis; and
 a punch portion being coaxial with the central axis of the body portion and extending from the body portion such that the annular-shaped surface encircles the punch portion, the punch portion including an outer peripheral surface extending in a direction of the central axis and having a cylindrical profile, the outer peripheral surface of the punch portion comprising:
  a plurality of spaced apart cutouts encircling the punch portion;
  a plurality of spaced apart column portions encircling the punch portion, wherein each of the column portions is disposed between and spaces apart a respective pair of adjacently spaced apart cutouts; and
  a plurality of bridge portions encircling the punch portion, wherein each bridge portion connects a respective pair of adjacently spaced apart column portions,
  wherein each of the column portions and each of the bridge portions has the cylindrical profile, and wherein each of the column portions and each of the bridge portions resides on a common, imaginary circumferential plane.

2. The self-clinching fastener of claim 1, wherein each column portion extends from the annular-shaped surface of the body portion to a distal peripheral edge of the outer peripheral surface of the punch portion.

3. The self-clinching fastener of claim 2, wherein each bridge portion is positioned axially between the distal peripheral edge of the outer peripheral surface of the punch portion and a respective cutout of the plurality of cutouts.

4. The self-clinching fastener of claim 1, wherein a threaded through-hole is formed in at least one of the body portion and the punch portion.

5. A self-clinching fastener for attachment to a plastically deformable metal substrate, the self-clinching fastener comprising:
 a body portion with a central axis, the body portion including an outer peripheral surface extending in a direction of the central axis, and an annular-shaped surface extending in a direction perpendicular to the central axis;
 a punch portion being coaxial with the central axis and extending from the body portion such that the annular-shaped surface encircles the punch portion, the punch portion including an outer peripheral surface extending in a direction of the central axis and having a cylindrical profile, the outer peripheral surface of the punch portion comprising:

a plurality of spaced apart cutouts encircling the punch portion;

a plurality of spaced apart column portions encircling the punch portion, wherein each of the column portions is disposed between and spaces apart a respective pair of adjacently spaced apart cutouts; and a plurality of bridge portions encircling the punch portion, wherein each bridge portion connects a respective pair of adjacently spaced apart column portions, wherein each of the column portions and each of the bridge portions has the cylindrical profile, and wherein each of the column portions and each of the bridge portions resides on a common, imaginary circumferential plane; and a plurality of spaced apart lugs encircling the punch portion and axially projecting outwards from the annular-shaped surface, wherein each lug is radially aligned with a respective one of the plurality of cutouts, and wherein one of the lugs includes a contact face configured to engage said metal substrate, the contact face declining, relative to an imaginary horizontal plane on which the annular-shaped surface lies, in a radially outwards direction of the self-clinching fastener.

6. The self-clinching fastener of claim 5, the contact face having a first end portion and a second end portion, the first end portion being formed with the cutout that the one lug is radially aligned with and the second end portion being located at a peripheral edge of the annular-shaped surface, and the contact face continuously declining from the first end portion to the second end portion.

7. The self-clinching fastener of claim 6, wherein each column portion extends from the annular-shaped surface of the body portion to a distal peripheral edge of the outer peripheral surface of the punch portion.

8. The self-clinching fastener of claim 5, wherein the contact face has first and second end portions, the first end portion being formed with the cutout that the one lug is radially aligned with and the second end portion being coterminous with a peripheral edge of the annular-shaped surface, and the contact face continuously declining from the first end portion to the second end portion.

* * * * *